United States Patent
Hudson

[11] Patent Number: 5,968,625
[45] Date of Patent: Oct. 19, 1999

[54] LAMINATED WOOD PRODUCTS

[76] Inventor: Dewey V. Hudson, P.O. Box 518, Tarboro, N.C. 27886

[21] Appl. No.: 08/990,496

[22] Filed: Dec. 15, 1997

[51] Int. Cl.[6] .......................................................... B32B 3/10
[52] U.S. Cl. .................................. 428/54; 428/58; 428/106
[58] Field of Search ................................... 428/54–56, 58, 428/61, 106; 144/359

[56] References Cited

U.S. PATENT DOCUMENTS

| | | |
|---|---|---|
| 1,778,333 | 10/1930 | Neumann . |
| 2,139,880 | 12/1938 | Colucci . |
| 2,751,946 | 6/1956 | Gramelspacher . |
| 2,758,044 | 8/1956 | Terry . |
| 3,041,231 | 6/1962 | Fountain . |
| 3,127,304 | 3/1964 | Borup . |
| 3,279,138 | 10/1966 | Dittmar . |
| 3,287,203 | 11/1966 | Elmendorf . |
| 3,511,737 | 5/1970 | Katashi Oita et al. . |
| 3,686,061 | 8/1972 | Brown et al. . |
| 3,970,497 | 7/1976 | Glover et al. . |
| 4,035,538 | 7/1977 | Maekawa et al. . |
| 4,471,012 | 9/1984 | Maxwell . |
| 4,637,954 | 1/1987 | Ohsumi . |
| 4,643,784 | 2/1987 | Germond . |
| 4,743,484 | 5/1988 | Robbins . |
| 4,743,509 | 5/1988 | Kokrhanek . |
| 5,034,259 | 7/1991 | Barker . |
| 5,069,977 | 12/1991 | Goenner . |
| 5,098,762 | 3/1992 | Nakajima . |
| 5,109,898 | 5/1992 | Schacht . |
| 5,135,597 | 8/1992 | Barker . |
| 5,234,747 | 8/1993 | Walser et al. . |
| 5,283,102 | 2/1994 | Sweet et al. . |

Primary Examiner—Alexander Thomas
Attorney, Agent, or Firm—Rhodes & Mason, PLLC

[57] ABSTRACT

Laminated wood products are manufactured from first and second adjacent sawn wood strips that are cut with corresponding upper and lower edges, and inner and outer faces. The strips are rotated in opposite directions so that corresponding edges are toward each other, and the inner face of one strip and the outer face of the second strip are at the top of the strips. One of the strips is then turned end-to-end without rotation, so that both faces on the upper surface are either inner faces or outer faces. The adjacent edges are then glued to form a composite wood product. The composite product may form the surface ply of a five-layer face bonded wood laminate, which includes a center ply having edge dimensioning formed from the center ply. The surface laminate is preferably formed of reclaimed heartwood, and all layers of the face laminate are preferably formed of the same wood species.

16 Claims, 5 Drawing Sheets

Prior Art

Fig. 3

Prior Art

LAMINATED WOOD PRODUCTS

BACKGROUND OF THE INVENTION (1) Field of the Invention

The present invention relates generally to laminated wood products, and in particular to construction materials, such as flooring and the like manufactured from a plurality of wood segments bonded together in the horizontal or vertical dimension, or both, to form a single piece.

(2) Description of the Prior Art

A wood of increasing significance in the manufacture of building components, such as flooring, as well as furniture parts, is obtained by recycling beams and other framing lumber from commercial, residential and industrial buildings constructed in the late 1800s and early 1900s. Most of the reclaimed wood is long leaf or loblolly southern yellow pine, the heartwood of which is known as heart pine, which is of great beauty, with a distinctive grain pattern and a rich patina. Other woods, such as red and white oak, Douglas fir, redwood, bald cypress, chestnut, maple, hemlock, spruce, and others are also being reclaimed.

Due to its limited availability, and the cost of reclaiming and processing, this wood tends to be relatively expensive when compared to new lumber. Moreover, the dimensions of the pieces that can be cut from the reclaimed beams and other original lumber pieces, is often less than the dimensions desired in the pieces used in building or furniture construction. For example, flooring manufactured from reclaimed lumber often produces narrow widths, although wider boards are often desired for aesthetics. A similar problem is incurred in the manufacture of flooring and other wood components from newly cut trees.

In order to meet the demand for wider, longer and/or thicker wood pieces, and reduce the cost, strips of wood are often glued together or to non-wood substrates to increase the width, thickness and/or length of the wood piece. That is, two relatively narrow strips can be edge bonded to form a composite wood piece that has the width of the combined strips. The bottom face of a relatively thin layer or ply of the more costly wood can also be laminated to the upper face of a substrate to produce a thicker, but less costly wood piece. Two relatively short pieces can be glued end-to-end to produce a longer piece.

In addition to reducing the cost of the wood piece, proper face lamination to form a thicker wood piece has the advantage of imparting greater stability to the piece. Face laminated pieces are generally formed of an odd number of layers or plies, with alternating plies laid transverse to each other. For example, in a three ply laminate, the upper surface ply and the backing ply will have their grain extending in a longitudinal direction, while the grain of the center ply will be transverse to the longitudinal direction. The surface and backing plies will also be "balanced" in a known manner to equalize their tendency to cup or warp, taking into account the particular characteristics of wood types and thickness.

While prior art laminated wood products have considerable utility, further improvements are needed in order to improve the appearance and usefulness of this material. Two significant problems are addressed by the present invention. One improvement relates to improvements in the appearance of edge bonded wood laminates, while the other improvement relates to face bonded wood laminates. These improvements may be used alone or in combination in the production of improved laminated wood products.

As noted, edge bonded wood laminates are manufactured by bonding, e.g., gluing, two or more wood strips to each other at their abutting edges to form a larger composite wood piece having the desired width. The resultant composite product has physical properties much like those of a single wood piece. However, due to the differences in the color and grain of the individual boards, the resultant composite board still has the appearance of plural boards, and not that of a single board.

One attempt to improve the appearance of laminated wood boards, and simulate the appearance of a single board, is described in U.S. Pat. No. 5,135,597 to Barker. A product formed in accordance with the Barker teaching is manufactured by cutting adjacent wood strips from a larger lumber piece, and then alternately rotating the pieces in opposite directions about their longitudinal axes. Edges facing toward each other after rotation are then edge glued.

It is still readily apparent that the boards manufactured by the Barker procedure are made from two or more individual pieces, due primarily to the difference in light reflectance of the individual pieces, and the juxtaposition of knots and other character markings. Thus, there is still a need for an improved composite, edge bonded, wood laminate visually more similar to a single wood piece.

A second problem exists with face bonded wood laminates, particularly laminates with dimensioned edges used to join two or more laminate pieces or strips together at their edges to cover a large surface area. A common example of this type of product is wood flooring formed of a surface ply of relative more costly wood that has an upper exposed surface, a backing ply, and a transversely oriented intermediate layer of a relatively inexpensive wood.

The grain of the flooring strip surface and backing plies is normally in the direction of the longer dimension of the strip, with the grain of the intermediate ply being transverse to the longer dimension, providing dimensional stability to the piece.

The edges of each flooring strip are normally dimensioned by cutting a groove into one edge and one end of the piece, and a tongue in the opposed edge and end. Thus, when two of the pieces are joined at their edges, the tongue along the edge of one piece fits into the groove along the edge of another piece. Similarly, the tongue at the end fits into the groove of an abutting piece.

Since the grain of the intermediate ply is transverse to the lumber dimension, there is a tendency for the short tongue piece at the end of the strip to break off under the stresses experienced at the ends of abutting flooring. Therefore, it is the industry practice to bond a shim of multilayer plywood or some other type of very strong material between the face and backing layers at the end of the piece and form the tongue from this shim. While effective, the cost of the product is increased and the appearance is undesirable. A face laminated structure eliminating the need for this shim would be much preferred.

SUMMARY OF THE INVENTION

The present invention is directed to the manufacture of wood products by joining together a plurality of wood pieces. One aspect of the invention relates to wood boards formed of a plurality of edge glued wood strips, but having the appearance more like a single wood board. Another aspect of the invention relates to face bonded wood laminates having improved dimensionally stability that can be edge dimensioned without the necessity of positioning a shim at the end of the laminated piece. A further aspect of the invention relates to composite wood laminates combining both of these improvements.

As noted earlier, it is a common practice to bond, e.g., glue the edges of two or more wood strips to form a wider wood piece. In most instances, the pattern of the wood grain is not taken into account, resulting in a piece that has the appearance of multiple glued pieces, and not that of a single wood piece. The present invention produces a laminated product having its components oriented in a manner such that the appearance of the final product will be more like a single piece of wood.

In fact, by utilizing certain selection criteria, the final product, except under careful inspection, will have the appearance of a single wood piece. In order to minimize the visual difference, the corresponding edges with the tightest grain should be edge glued. Also, the laminated boards are preferably formed of vertical grain materials without significant figure or grain distortion. Since the grain difference increases with length, the laminated boards are preferably formed of shorter pieces, e.g., pieces from about 1 to about 2 meters.

In the present process a plurality of adjacent wood strips are sawn from a larger wood piece, so that the strips, when cut, have corresponding first and second edges, first and second ends, and first and second faces. That is, strips sawn with a vertically aligned rip saw, or a plurality of parallel, vertically aligned saws, will have corresponding upper and lower edges, and corresponding inner and outer faces.

After cutting, the strips are oriented so that the corresponding, e.g., upper or lower, edges of adjacent strips are toward each other. This step is the same as in the above-mentioned Baker process. However, in Baker, the upper surface of the product is comprised of alternating inner and outer faces, with the grain of one piece forming a mirror image of the grain in another piece. In the present invention, alternating strips are also turned end-to-end prior to bonding of the abutting faces of adjacent strips to each other to form the laminated product.

Thus, the final product is comprised of a plurality of edge bonded, wood strips sawn adjacent each other from a larger lumber piece, each of the strips, when cut, having corresponding upper and lower edges, corresponding near and far ends, and corresponding inner and outer faces, with the strips being oriented so that corresponding, edges of adjacent strips are abutting, and corresponding, e.g., inner or outer, faces of adjacent strips lie in a common plane.

For most applications, e.g., flooring and the like, two strips will be joined together to form the laminated board. However, depending upon the width of the strips and the desired width of the final product, the composite board may also be formed of three or more strips.

When manufacturing an edge bonded laminate of only two strips, the method comprises sawing first and second adjacent wood strips from a larger wood piece, each of the strips, when cut, having corresponding first and second edges, first and second ends, and first and second faces; orienting the strips so that the first edges are toward each other and the first faces lie in a common plane; and bonding the first edges to each other. When the strips are vertically sawn, the first edges may be either the upper or lower edges.

The resultant product is a laminated wood board comprised of edge bonded, first and second strips sawn adjacent each other from a larger lumber piece, each of the strips, when cut, having corresponding first and second edges, first and second ends, and first and second faces, with the strips being oriented so that the corresponding first edges are abutting, and corresponding faces lie in a common plane.

The face-laminated products of the present invention are comprised of five laminated layers or plies; namely, an upper surface ply, a bottom backing ply, a center ply and two intermediate plies. Each layer is face glued to the adjacent layer or layers. The grain of the surface, backing and center plies extend in the same direction, while the grain of the intermediate plies, one intermediate ply being between the surface and center ply and the other being located between the center and backing plies, is transverse to the direction of the grain in the surface, center and backing plies.

For purposes of brevity and clarity, the face laminate products will be described in terms of wood flooring, and in particular, wood flooring manufactured from reclaimed lumber, such as long leaf yellow pine. It is to be understood, however, that the invention is also applicable to the manufacture of other wood products, such as stair treads, ceiling beams, furniture components, etc. Also, wood other than reclaimed wood, including combinations of wood species, can be used.

The top or surface ply of the laminate is normally a layer of the more costly wood, such as sawn, reclaimed heartwood, since the upper surface of this ply will be exposed. The surface ply may be made of other types of wood, however, with the wood being sawn or veneered. Also, the surface ply may be composite wood formed of a plurality of short pieces that are end and edge glued to each other.

The backing layer may be of the same specie as the face layer, or it may be produced from less expensive specie of wood, such as Douglas fir. Different wood plies expand and contract to different degrees, depending upon the kind of wood and the thickness of the ply. Therefore, in order to prevent warping or bending, it is the industry practice to "balance" the surface and backing plies, so that they expand or contract to the same extent. Thus, the thickness of the backing layer will depend upon the type of wood used and the thickness of the surface layer.

The intermediate plies are preferably constructed of a plurality of abutting, edge bonded wood strips. The type of wood used for the intermediate layer strips is normally of an inferior grade relative to the surface ply, and may be of the same wood specie as the surface ply, or a different type. For example, the intermediate plies may be formed of reclaimed sapwood, while the surface layer is formed of reclaimed heartwood. This combination not only reduces the overall cost of the reclaimed wood since all parts of the reclaimed wood can be used, but also provides a laminated product with greater stability, since all or a large part of the product is of the same specie wood. Manufacturing the center and backing plies from the same specie wood can further enhance stability. The intermediate plies are preferably, but not necessarily, of the same thickness.

Conventional wood flooring is comprised of a plurality of wood strips or planks that are laid with abutting edges and ends. Generally, the opposed edges and ends of the strips are dimensionally shaped with a protrusion or tongue on one side and one end, and corresponding grooves or recesses on the opposite side and end, so that the tongue of one strip fits into a corresponding groove in the abutting strip to provide alignment and a better fit.

The center ply of the laminated product may a single wood piece, or it may be composite wood formed of a plurality of pieces that are end and/or edge glued to each other. For example, the center ply may be comprised of a center section and at least one end section end glued to an end of the center section. End sections may also be glued to both ends of the center section. All of these sections may be on the same material or specie. Alternatively, the end sections, or at least the end section from which the protrusion is cut, can be of a higher quality material, e.g., heartwood, while the center section is of an inferior material, e.g., sapwood. The grain of at least one end section, and preferably both sections, is along the longitudinal axis of the board.

Also, the center ply can be constructed of a plurality of strips that are end and edge glued to form a composite board. The ends of the pieces, in this embodiment and in the preceding embodiments can be attached by gluing square abutting ends or with finger joints. Also, the pieces at one or both ends of the board can be formed of a higher-grade material, such as heartwood, while the inner pieces can be formed of an inferior material, such as sapwood. The grain of the pieces is parallel to the longitudinal axis of the board.

In a preferred embodiment of the invention, the protrusion on the edge dimension is cut in substantial part from the center ply, i.e., the protrusion or tongue is comprised of the center ply, but may also include a portion of the adjacent intermediate strips. When the protrusion or tongue is cut in substantial part from the center ply, this configuration results in a product having an appearance more like a single wood piece. More importantly, the tongue or protruding portion at the end of the product has a greater strength, since it extends transverse to the grain of the center ply. Thus, breaking of the protrusion is virtually eliminated, making addition of a plywood shim unnecessary.

The overall dimensions of the product will depend upon the product's end use. For flooring, as an example, the product may have a thickness of from about 8 mm to about 32 mm, while thickness of up to about 50 mm may be used for stair treads or furniture parts. Other products might require a thickness of 6 mm or less, or 75 mm or more. The width of the product will also depend upon the end use. If greater widths are desired, the earlier described, edge laminated boards can be used as the surface ply of the laminated product.

The resulting product will be comprised of:
a) a surface ply having an upper exposed face and a lower face having a longitudinal direction, the surface ply being formed of a plurality of edge bonded strips sawn adjacent each other from a larger lumber piece, each of the strips, when cut, having first and second edges, first and second ends, and first and second faces, the strips being oriented so that first edges of adjacent strips are abutting, second edges of adjacent strips are abutting, and first faces of all strips lie in a common plane to form the upper exposed face.
b) a first intermediate ply constructed of a plurality of edge and or end bonded strips having an upper face bonded to the lower face of the surface ply and a lower face;
c) a center ply having an upper face bonded to the lower face of the first intermediate ply, and a lower face, the center ply including a grooved side edge, a tongued side edge, a grooved end, and a tongued end;
d) a second intermediate ply having an upper face bonded to the lower face of the center ply and a lower face, the first and second intermediate plies being constructed of a plurality of adjacent edge and or end bonded strips, the strips having a longitudinal direction transverse to the longitudinal direction of the surface ply; and
e) a backing ply having an upper face bonded to the lower face of the second intermediate ply.

Accordingly, one aspect of the present invention is to provide an edge bonded wood laminate constructed of a plurality of strips, but having the appearance of a single board.

Another aspect of the present invention is to provide an edge dimensioned, five-layer wood laminate having improved dimensional stability, with the protrusions of the edge dimension being cut entirely into the center ply of the laminate.

Still another aspect of the present invention is to provide a five-layer wood laminate that includes a surface layer formed from a plurality of edge bonded strips, but having the appearance of a single board.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, upper, lower, inner, outer, and the like, are used solely for the purpose of clarity in illustrating the invention, and should not be taken as words of limitation. The drawings are for the purpose of illustrating the invention and are not intended to be to scale.

FIGS. 1(a)–1(d) illustrate the preferred method of manufacturing edge bonded wood laminates. Two pairs of strips are combined in the illustrated embodiment to form two composite boards. It will be apparent, however, that the invention is also applicable to edge laminating three or more strips to form a single board.

Figure 1:
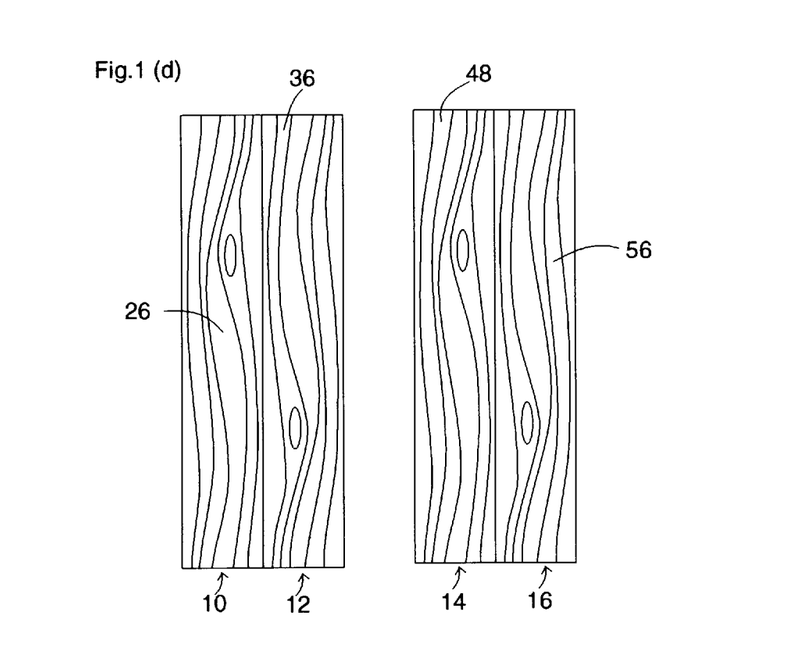
FIG. 1(a) is a perspective view of four wood strips cut in preparation for forming an edge bonded wood laminate.
FIG. 1(b) is a perspective view of the four strips cut in FIG. 1(a) being rotated in alternating directions.
FIG. 1(c) is a perspective view of the four strips rotated as in FIG. 1(b), with alternate boards being rotated end-to-end.
FIG. 1(d) is a top view of the four boards of FIG. 1(c) edge bonded to form composite boards.
Figure 1A:
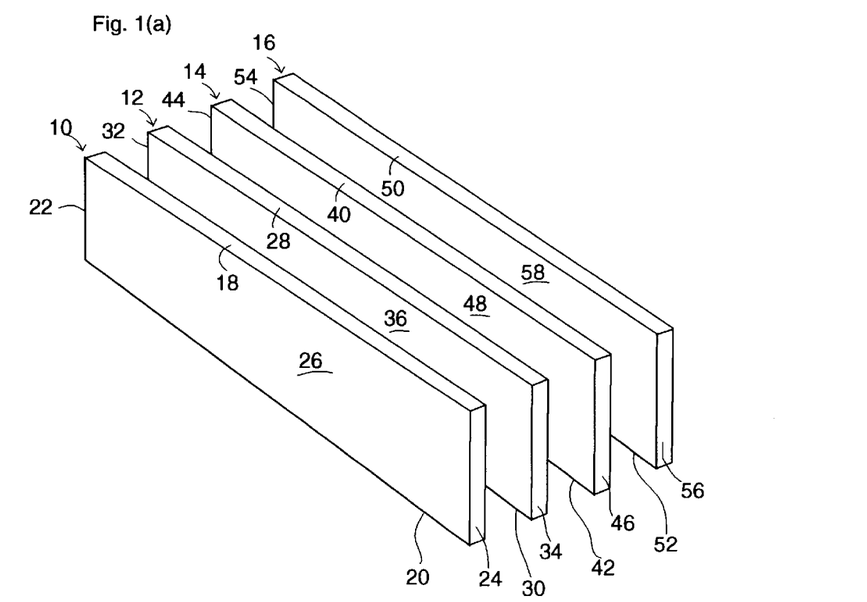

FIG. 1(a) illustrates four identically dimensioned wood strips 10, 12, 14 and 16 sawn with successive adjacent cuts from a larger wood piece. Strip 10 includes in upper edge 18, a lower edge 20, a rear end 22, a front end 24, and an inner face 26. Strip 12 includes in upper edge 28, a lower edge 30, a rear end 32, a front end 34, an inner face 36 and an outer face 38. Strip 14 includes in upper edge 40, a lower edge 42, a rear end 44, a front end 46, and an inner face 48. Strip 16 includes in upper edge 50, a lower edge 52, a rear end 54, a front end 56, an inner face 58 and an outer face 60.

Figure 1B:
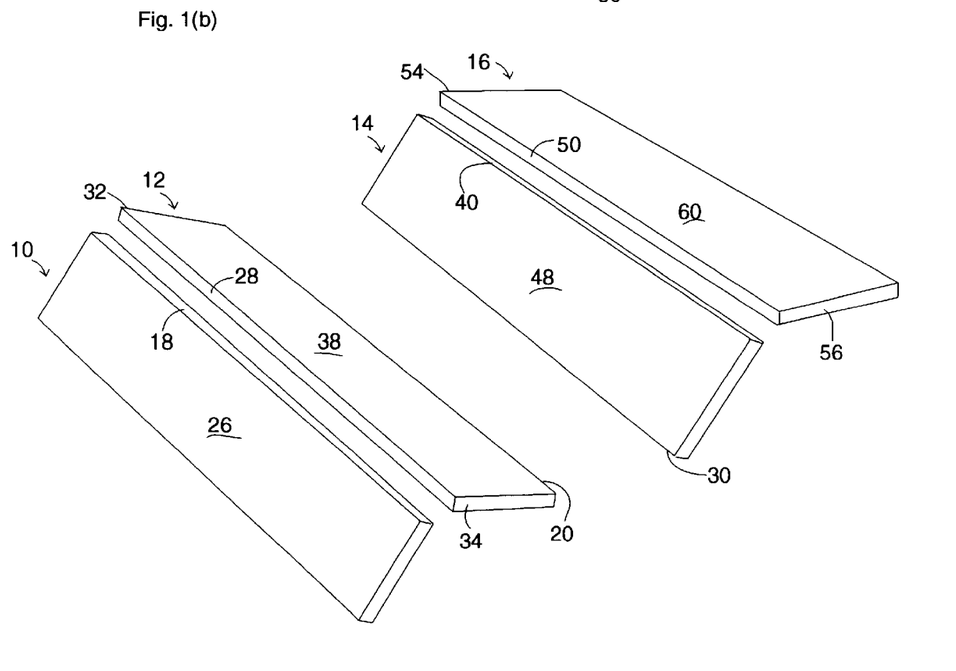

As illustrated in FIG. 1(b) strips 10–16 are rotated around their longitudinal axes in alternating directions. As shown, strips 10 and 14 are rotated clockwise, while strips 12 and 16 are rotated counterclockwise, "folding" the strips into a horizontal plane, to abut edge 18 with edge 28, and edge 40 with edge 50. The upper surfaces of the horizontal strips are comprised of inner face 26 in a plane with outer face 38, and inner face 48 in a plane with outer face 60.

Figure 3:
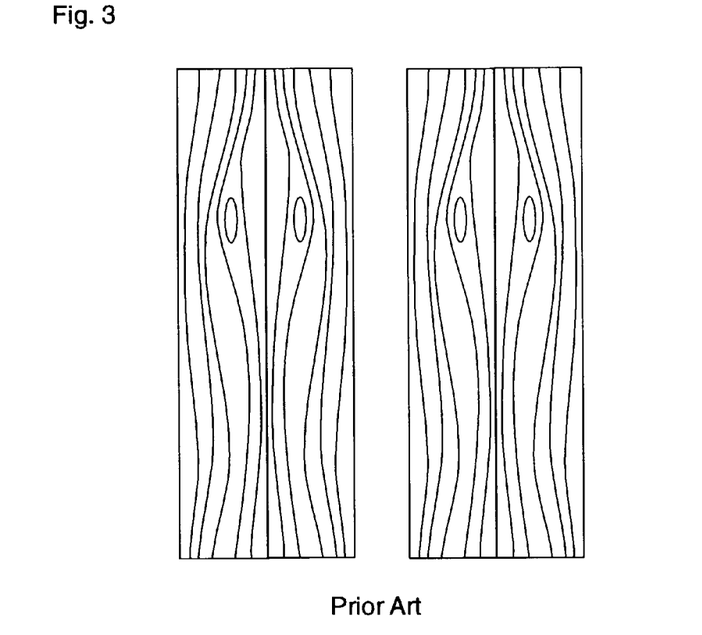
FIG. 3 is a top view of prior art, edge-bonded, book-matched boards.

The grain pattern of the strips in this configuration is illustrated in FIG. 3. The presence of different strips is apparent from the mirror image of the grain pattern and the juxtaposition of the markings. While not apparent from the drawings, the difference in the strips is also highlighted by the difference in their light reflectance.

Figure 1C:
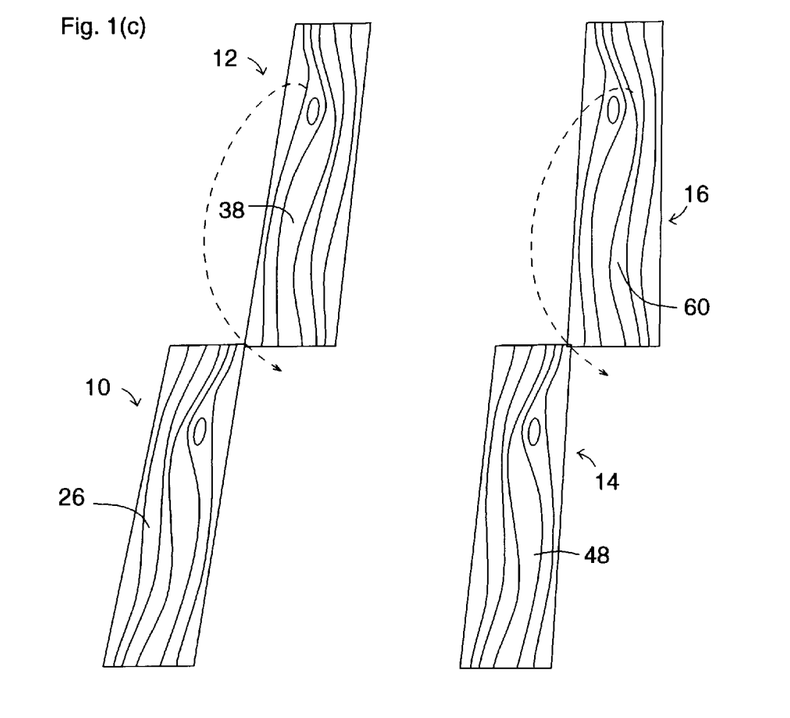

FIG. 1(c) illustrates the further manipulation of the strips of 1(b). In this step, strips 12 and 16 are "flipped" to reverse their rear and front ends, thus reversing their faces while maintaining their relative edge positions. That is, strip 12 is turned end to end to reverse the positions of ends 32 and 34, and strip 16 is turned end to end to reverse the positions of ends 54 and 56. Since strips 12 and 16 are not rotated as they are flipped, face 36 is moved into a plane with face 26, and face 56 is moved into a plane with face 48.

The abutting edge pairs 18–28 and 40–50 are edge bonded with a suitable glue. The resultant laminated boards are illustrated in FIG. 3(d). The grain pattern of the wood and the interface between the strips are highly exaggerated for purposes of illustration. With actual strips, the grain pattern is not as pronounced. Even from the illustration, however, it should be readily apparent that the above procedure results in a laminated wood product that has a visual appearance more like that of a single wood piece.

Figure 2:
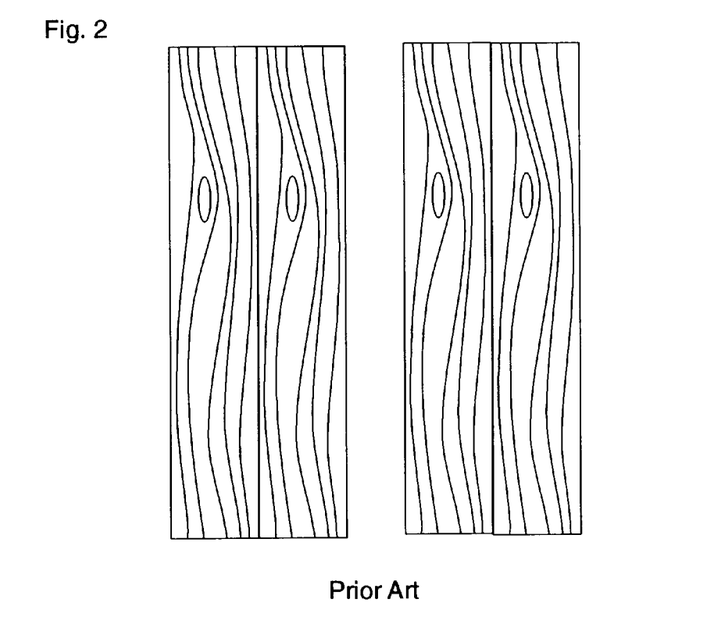
FIG. 2 is a top view of prior art, edge-bonded, slip-matched boards.

For comparison purposes, FIG. 2 illustrates the pattern that would result with a "slipmatch" in which all strips were rotated in the same direction and none of the strips were turned end-to-end.

FIG. 3, noted above, illustrates a "bookmatch" of the type described in the Barker patent, in which the strips are rotated about their longitudinal axis in alternating directions, but none of the strips are turned end-to-end.

Figure 4:
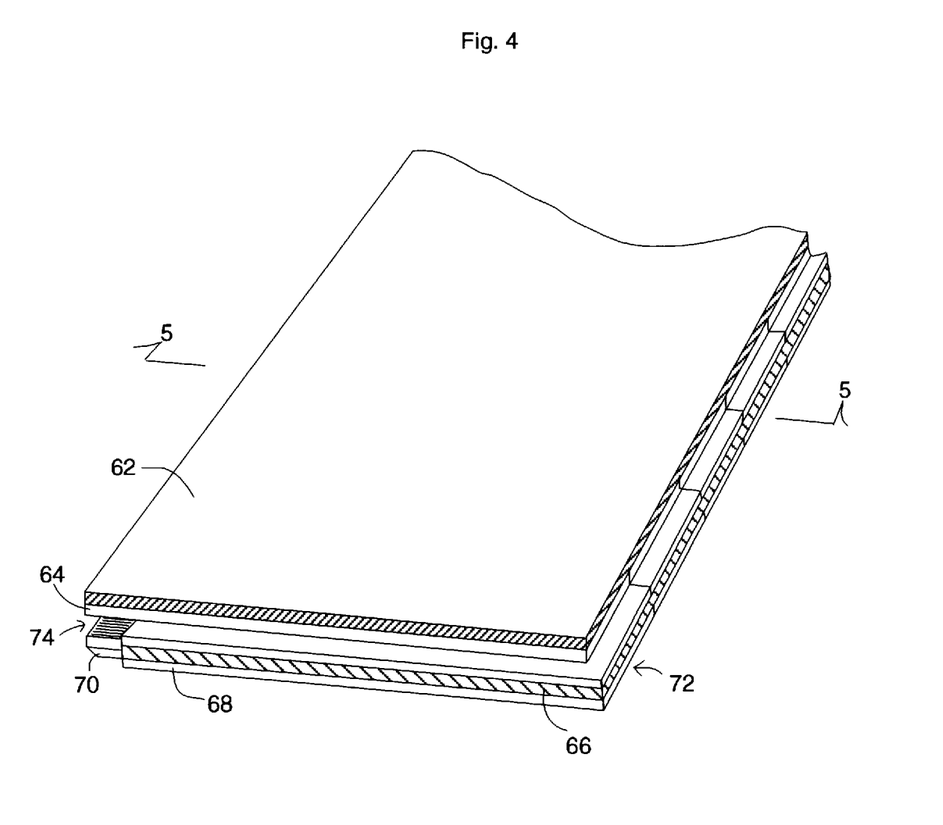
FIG. 4 is a perspective view of a face laminated strip of the present invention.
Figure 5:
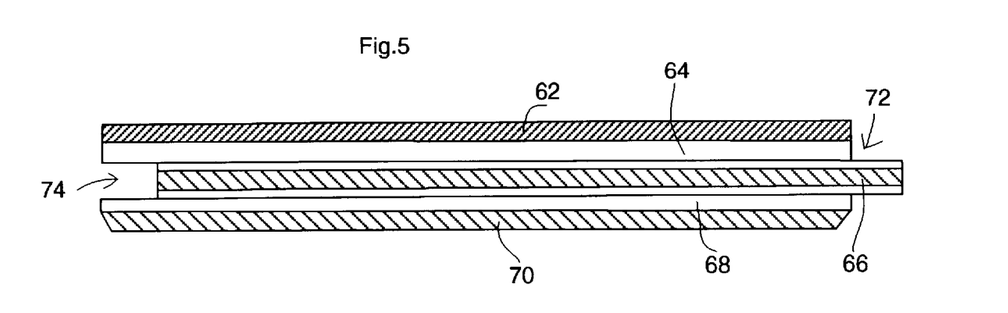
FIG. 5 is sectional side view of the strip as seen along line 5—5 of FIG. 4.

FIGS. 4 and 5 illustrate an example of the five-ply, face laminated wood products of the present invention. The illustrated tongue and groove flooring strip, is comprised of an upper surface ply 62, a first intermediate ply 64, a center ply 66, a second intermediate ply 68, and a backing ply 70. Each ply is face glued to the adjacent ply or plies.

The grain of plies 62, 66 and 70 extend along the longitudinal axis of the strip, while the grain of intermediate plies 64 is transverse to the longitudinal axis. Top ply 62, may be comprised of two edge bonded sawn sections, manufactured as described above. Alternatively, ply 62 can be made from a single wood piece.

Center ply 66, as illustrated in the preferred embodiment, is a single wood piece, such as new wood of the same specie as surface ply 62. A tongue 72 extends along one side of ply 66, and a corresponding groove 74 extends along the opposite side of ply 66. Another tongue 74 extends along an end of ply 66 so that the strip can be joined at its end to the grooved end of another strip.

Backing ply 70, which is preferably of new wood of the same specie as surface ply 62. Intermediate plies 64 and 68, in the illustrated embodiment, are constructed of a plurality of abutting, edge bonded wood strips 78.

In a preferred embodiment, surface ply is made from edge bonded strips of reclaimed pine heartwood; Center ply 66 and backing ply 70 are made from new pine; and intermediate plies 64 and 68 are made from edge bonded strips of reclaimed pine sapwood. Thus, the final product is entirely a same specie product of superior stability. In addition, both the reclaimed heartwood and sapwood can be used, reducing the overall cost of the product. The thicknesses of surface ply 62 and backing ply 70 are substantially the same, and the thicknesses of intermediate plies 64 and 68 are also substantially the same.

Figure 6:
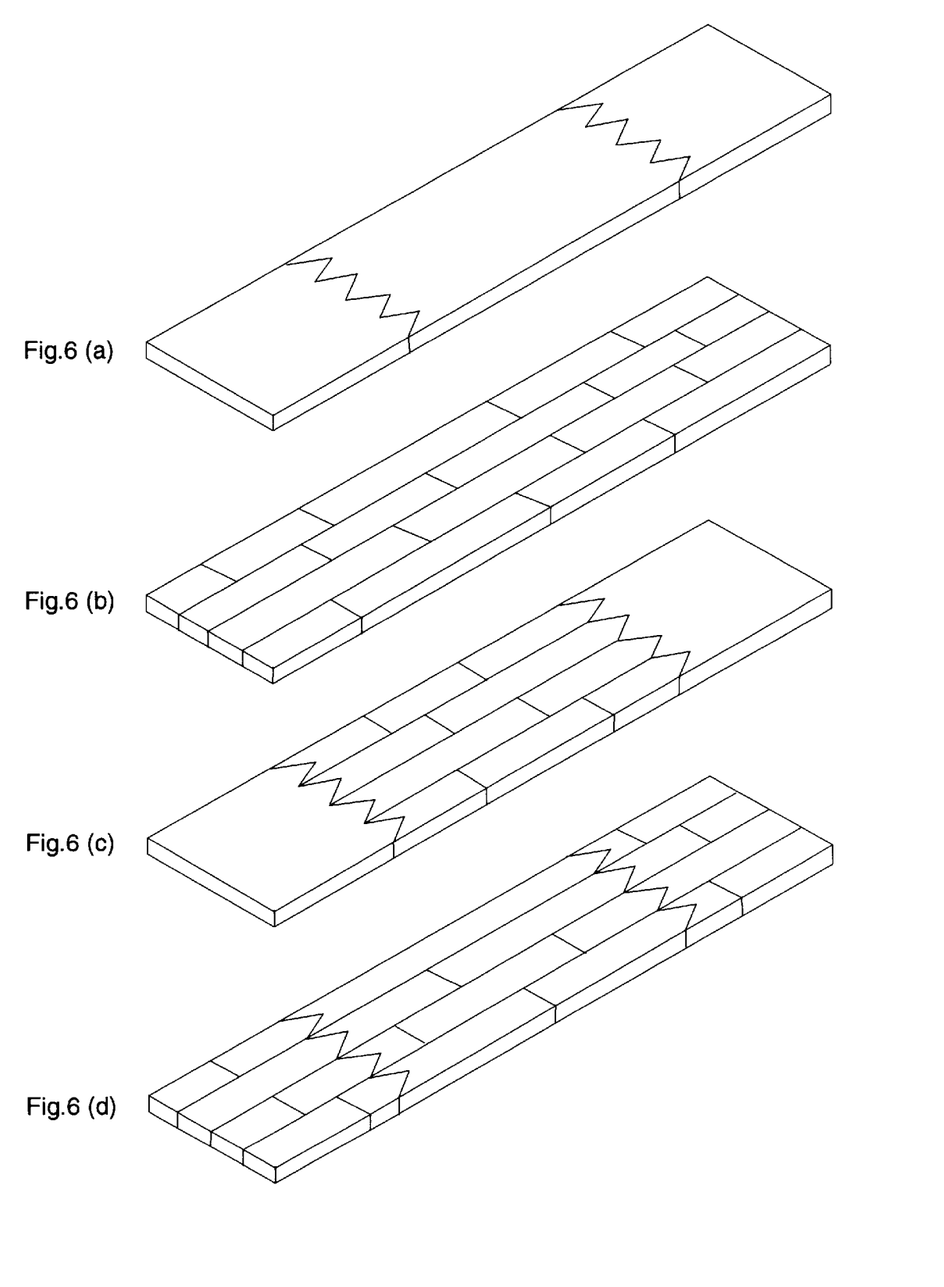
FIG. 6(a) is an alternative center ply board constructed of a center section with two finger glued end sections, each section being a single wood piece.
FIG. 6(b) is an alternative center ply board constructed of a plurality of end and edge glued pieces.
FIG. 6(c) is an alternative center ply board constructed of a center section with two finger glued end sections, each end section being a single wood piece, and the center section being constructed of a plurality of end and edge glued pieces.
FIG. 6(d) is an alternative center ply board constructed of a center section with two end glued end sections, each section being constructed of a plurality of end and edge glued pieces.

Center ply 66, instead of being a single wood piece, can be constructed of a plurality of wood pieces that are edge and/or end glued to form a composite board. FIGS. 6(a)–6(d) illustrate some of these composite boards. As shown in FIG. 6(a), the center ply board may be formed of at least one end section, and preferably two end sections, that are different from the center section of the board. Thus, an end section of a higher value wood can be positioned at the end of the board from which the protrusion or tongue is to be cut, while the center of the board, which will not be visible, can be constructed of an inferior material, such as sapwood or a lower grade lumber.

FIG. 6(b) illustrates a center ply board constructed of a plurality of end and edge glued strips. All of the strips can be of the same material, or the strips as one end of the board, especially the board from which the tongue is cut, can be of a higher-grade material.

FIG. 6(c) illustrates a center ply board formed of solid wood end sections and a center section formed of a plurality of end and edge glued pieces, thus enabling the use of even lower grade material in the unseen center section, while using an end section at one of both ends that is resistant to breakage, and preferably has an appearance and color similar to the top layer.

FIG. 6(d) illustrates a center ply board formed of a center section and opposed end sections, all of the sections being constructed of end and edge glued pieces. Again, the end sections can be formed of a higher-grade material. Also, it will be apparent that the sections can be joined by glued square abutting ends or by finger joints. It will also be apparent to one skilled in the art that the elements of the illustrated examples can be combined in different ways to construct other boards.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A laminated wood product comprised of at least first and second adjacent sawn wood strips, each of said strips, when cut, having corresponding first and second opposed edges, and first and second opposed faces, said strips being oriented so that the first edge of said first strip abuts the first edge of said second strip, and said first faces lie in a common plane.

2. The laminated wood product of claim 1, further including a third strip sawn adjacent said second strip, said third strip, when cut, having first and second opposed edges, and first and second opposed faces, corresponding to those of said first and second strips, the second edge of said third strip being bonded to the second edge of said second strip, the first faces of said strips lying in a common plane.

3. The laminated wood product of claim 1, wherein said first edges are upper edges.

4. The laminated wood product of claim 1, wherein first edges are lower edges.

5. The laminated wood product of claim 1, wherein first faces are inner faces.

6. The laminated wood product of claim 1, wherein said first faces are outer faces.

7. The laminated wood product of claim 1, wherein said wood strips are made from reclaimed heartwood pine.

8. A face bonded, laminated wood product comprised of:
 a) a surface ply having an upper exposed face and a lower face, said surface ply being comprised of at least first and second adjacent sawn wood strips, each of said strips, when cut, having corresponding first and second opposed edges, and first and second opposed faces, said strips being oriented so that the first edge of said first strip abuts the first edge of said second strip, and said first faces lie in a common plane;
 b) a first intermediate ply having an upper face bonded to the lower face of said surface ply and a lower face;
 c) a center ply having an upper face bonded to the lower face of said first intermediate ply, and a lower face, said center ply having dimensioned edges;
 d) a second intermediate ply having an upper face bonded to the lower face of said center ply and a lower face; and
 e) a backing ply having an upper face bonded to the lower face of said second intermediate ply.

9. The product of claim 8, wherein said center ply is formed of a single wood piece with grain along its longitudinal axis.

10. The product of claim 8, wherein said first and second intermediate plies are comprised of a plurality of adjacent edge bonded strips, said strips having a longitudinal direction transverse to the longitudinal direction of said surface ply.

11. The product of claim 10, wherein said surface ply is formed from reclaimed heartwood, and the strips of said intermediate plies are formed form reclaimed sapwood.

12. The product of claim 10, wherein said center ply is constructed of a center section and at least one end section.

13. The product of claim 10, wherein said center ply is constructed of a plurality of end and edge glued pieces.

14. A laminated wood product comprised of:
 a) a surface ply having an upper exposed face and a lower face, said ply being constructed of first and second adjacent sawn wood strips, each of said strips, when cut, having corresponding first and second opposed edges, and first and second opposed faces, said strips being oriented so that the first edge of said first strip abuts the first edge of said second strip, and said first faces lie in a common plane;
 b) a first intermediate ply having an upper face bonded to the lower face of said surface ply and a lower face;
 c) a center ply having an upper face bonded to the lower face of said first intermediate ply, and a lower face, said center ply having tongues extending along one side and one end, and grooves extending along the other side and end, said tongues and grooves being formed entirely of said center ply;
 d) a second intermediate ply having an upper face bonded to the lower face of said center ply and a lower face, said first and second intermediate plies being formed of edge bonded strips oriented transverse to said surface, center and backing plies; and
 e) a backing ply having an upper face bonded to the lower face of said second intermediate ply.

15. The product of claim 14, wherein all of said plies are of the same wood species.

16. The product of claim 15, wherein said surface ply is made from reclaimed heartwood, and said intermediate plies are made from reclaimed sapwood.

* * * * *